United States Patent
Chang

(10) Patent No.: US 10,136,683 B2
(45) Date of Patent: Nov. 27, 2018

(54) THREE-WIRE WEARABLE DEVICE

(71) Applicants: Shu-Ling Chen, Taipei (TW); Chih-Te Chang, Taipei (TW)

(72) Inventor: Pao-Chin Chang, Taipei (TW)

(73) Assignees: Shu-Ling Chen, Taipei (TW); Chih-Te Chang, Taipei (TW)

(*) Notice: Subject to any disclaimer, the term of this patent is extended or adjusted under 35 U.S.C. 154(b) by 0 days.

(21) Appl. No.: 15/871,211

(22) Filed: Jan. 15, 2018

(65) Prior Publication Data

US 2018/0220719 A1  Aug. 9, 2018

(30) Foreign Application Priority Data

Feb. 8, 2017 (TW) .............................. 106104134 A

(51) Int. Cl.
| | |
|---|---|
| H04B 5/00 | (2006.01) |
| H04B 3/54 | (2006.01) |
| A41D 1/00 | (2018.01) |
| A44B 11/00 | (2006.01) |
| G06F 9/48 | (2006.01) |
| H04B 1/3827 | (2015.01) |

(52) U.S. Cl.
CPC ............ *A41D 1/005* (2013.01); *A44B 11/005* (2013.01); *G06F 9/4893* (2013.01); *H04B 1/385* (2013.01); *H04B 2001/3855* (2013.01)

(58) Field of Classification Search
CPC ..... H04B 3/54; H04B 2001/3855; H04B 5/00
See application file for complete search history.

(56) References Cited

U.S. PATENT DOCUMENTS

| | | | | |
|---|---|---|---|---|
| 5,872,744 A * | 2/1999 | Taylor | .................. | G04G 17/083 |
| | | | | 224/164 |
| 6,765,361 B1 * | 7/2004 | Beifus | ....................... | H02P 6/00 |
| | | | | 318/605 |
| 7,082,203 B1 * | 7/2006 | Drakoulis | .............. | H04B 1/207 |
| | | | | 381/14 |
| 9,369,237 B2 * | 6/2016 | Wiley | .................... | H04L 1/0014 |
| 9,553,635 B1 * | 1/2017 | Sejpal | ....................... | H04B 3/54 |
| 9,843,217 B2 * | 12/2017 | Atasoy | .................... | H02J 7/025 |
| 2003/0209088 A1 * | 11/2003 | Sullivan | .................. | B60R 22/48 |
| | | | | 73/862.391 |
| 2008/0025450 A1 * | 1/2008 | Alfano | .................... | H01L 23/66 |
| | | | | 375/362 |
| 2009/0021077 A1 * | 1/2009 | Zilberberg | .............. | H02J 9/065 |
| | | | | 307/66 |
| 2012/0246350 A1 * | 9/2012 | Lee | ........................ | H02J 7/0008 |
| | | | | 710/16 |
| 2014/0077718 A1 * | 3/2014 | Zotter | ................ | H05B 33/0815 |
| | | | | 315/224 |

(Continued)

*Primary Examiner* — Cindy Trandai
(74) *Attorney, Agent, or Firm* — Li & Cai Intellectual Property (USA) Office

(57) ABSTRACT

A three-wire wearable device provided by the present disclosure provides numerous functions, a diversity of uses and convenience by a specific design of a first buckle and detachable second buckles. When the second buckles are fastened to the first buckle, the first buckle mutually communicates with the second buckles by using different pulse signals or digital signals through the three-wire transmission, such that the first buckle can be integrated with function modules of all of the second buckles, such as a touch panel, a screen, a heat dissipation pad, and so forth.

20 Claims, 12 Drawing Sheets

(56) References Cited

U.S. PATENT DOCUMENTS

| | | | | |
|---|---|---|---|---|
| 2014/0216459 A1* | 8/2014 | Vos | ............... | G01K 7/24 128/204.17 |
| 2014/0254712 A1* | 9/2014 | Lee | ............... | H04B 3/06 375/295 |
| 2014/0266663 A1* | 9/2014 | Schlaps | ............ | B60R 22/48 340/457.1 |
| 2015/0030112 A1* | 1/2015 | Wiley | ............. | H04L 25/0292 375/360 |
| 2015/0043358 A1* | 2/2015 | Wiley | ............. | H04L 1/0014 370/242 |
| 2015/0043693 A1* | 2/2015 | Lee | ............... | G06F 13/36 375/354 |
| 2015/0098538 A1* | 4/2015 | Wiley | ............. | H04L 1/205 375/355 |
| 2015/0130700 A1* | 5/2015 | Chen | .............. | H02J 7/0045 345/156 |
| 2015/0148634 A1* | 5/2015 | Garudadri | ...... | A61B 5/02141 600/323 |
| 2015/0244206 A1* | 8/2015 | Shires | ............ | H02J 9/062 307/52 |
| 2016/0013926 A1* | 1/2016 | Kil | ................ | H04L 7/0091 370/517 |
| 2016/0127159 A1* | 5/2016 | Koli | .............. | H04L 25/0272 375/259 |
| 2016/0301519 A1* | 10/2016 | Sengoku | ........ | H04L 7/0045 |
| 2017/0039163 A1* | 2/2017 | Sejpal | ........... | H04L 25/4917 |
| 2017/0047881 A1* | 2/2017 | Shimura | ........ | H02P 29/50 |
| 2017/0179831 A1* | 6/2017 | Yu | ................ | H02M 3/33569 |
| 2017/0297703 A1* | 10/2017 | Thelen | .......... | B64C 39/024 |
| 2018/0049292 A1* | 2/2018 | Chawda | .......... | H05B 37/02 |
| 2018/0062883 A1* | 3/2018 | Duan | ............ | G01R 31/31709 |

\* cited by examiner

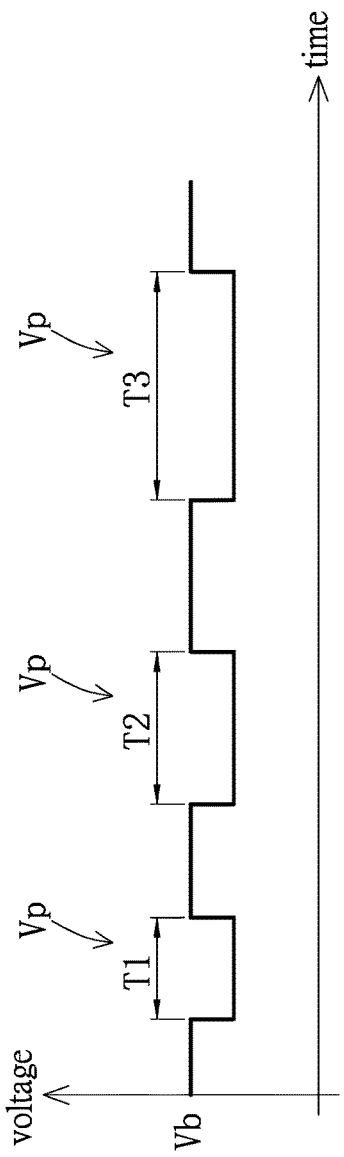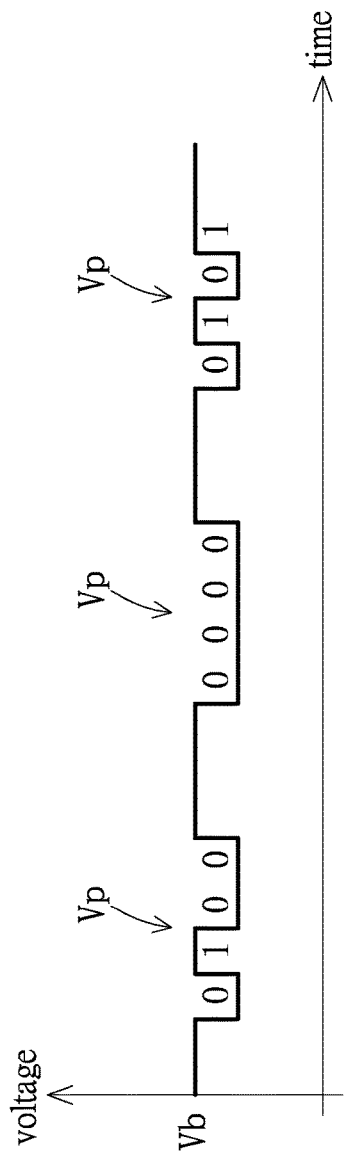

THREE-WIRE WEARABLE DEVICE

BACKGROUND OF THE INVENTION

1. Field of the Invention

The present disclosure relates to a three-wire wearable device; in particular, to a three-wire wearable device wherein electronic modules separately configured on the wearable device are integrated by using the three-wire transmission.

2. Description of Related Art

Many kinds of apparel are worn by people in their daily lives, such as clothes, coats, pants, shoes, socks, gloves, hair decoration, brooches, scarves, rain coats, backpacks, bags . . . and the like. People wear light clothes when it is hot, heavy clothes when it turns cold, and rain coats when there is rain. People bring bags to markets and malls for shopping. In other words, people are inseparable with the apparel they wear.

With the advancement of technology, many kinds of smart wearable devices have been developed, such as smart watches, smart bracelets, smart headphones or other wearable devices. However, these devices can usually only perform functions based on pre-installed applications and have difficulty providing extended functionalities, or even if these devices can provide other functions off of extended applications, the applications cannot be fully integrated, such that users cannot conveniently use these wearable devices.

SUMMARY OF THE INVENTION

The present disclosure discloses a three-wire wearable device. In the three-wire wearable device, all function modules, such as a touch panel, a screen, a heat dissipation pad and the like, are integrated by using three-wire transmission to provide convenience to users.

The three-wire wearable device provided by the present disclosure includes a first buckle and a plurality of second buckles. The first buckle has a first pin, a second pin and a third pin and includes a first processing unit. The first processing unit stores a plurality of instructions and a plurality of communication protocols. The first buckle chooses one of the instructions and accordingly generates a pulse-width modulation (i.e., PWM) signal. The PWM signal is transmitted to the first pin and represents the chosen instruction. Each second buckle has a fourth pin, a fifth pin and a sixth pin, and each second buckle is fastened to the first buckle but is detachable. When the second buckles are fastened to the first buckle, the first pin, the second and the third pin of the first buckle are respectively and electrically connected to the fourth pin, the fifth pin and the sixth pin of each second buckle. Each second buckle is connected in parallel to the first buckle, with its fifth pin being grounded. When the second buckles are fastened to the first buckle, the PWM signal from the first pin of the first buckle is transmitted to the fourth pin of each second buckle. The communication protocol used for the communication between the third pin of the first buckle and the sixth pin of the second buckle is determined according to different PWM signals.

To sum up, the three-wire wearable device of the present disclosure provides numerous functions, a diversity of uses and convenience by a specific design of the first buckle and the detachable second buckles. When the second buckles are fastened to the first buckle, the first buckle mutually communicates with the second buckles by using different pulse signals or digital signals through the three-wire transmission, such that the first buckle can be integrated with function modules of all of the second buckles, such as a touch panel, a screen, a heat dissipation pad and the like.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIG. 3A shows a schematic diagram of a PWM signal according to one embodiment of the present disclosure;

FIG. 3B shows a schematic diagram of a PWM signal according to another embodiment of the present disclosure;

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

Figure 1:
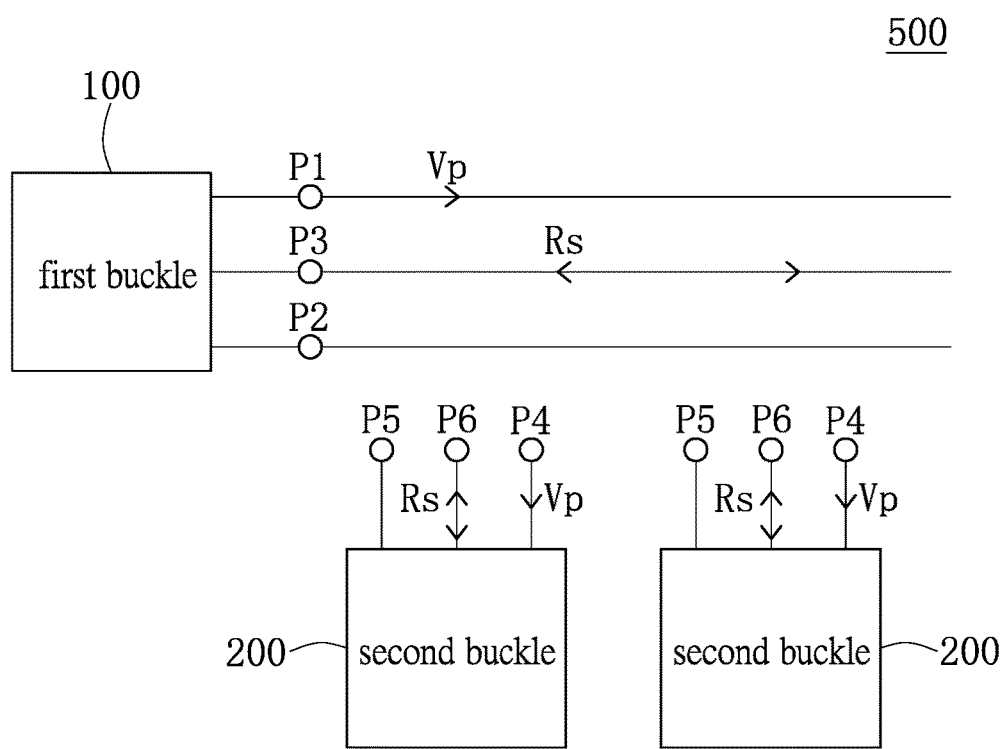
FIG. 1 shows a schematic diagram of a three-wire wearable device according to one embodiment of the present disclosure.

Referring to FIG. 1, a schematic diagram of a three-wire wearable device according to one embodiment of the present disclosure is shown. As shown in FIG. 1, the three-wire wearable device 500 includes a first buckle 100 and a plurality of second buckles 200. When the second buckles 200 are fastened to the first buckle 100, the first buckle 100 is integrated with function modules of each second buckle 200, such as a touch panel, a screen, a heat dissipation pad and the like. Therefore, the first buckle 100 can control the second buckles 200, and the first buckle 100 can transmit data to the second buckles 200 and receive data from the second buckles 200. In this embodiment, the first buckle 100 and second buckles 200 are detachably disposed on the wearable device 500. Therefore, how the first buckle 100 and second buckles 200 are configured on the wearable device 500 can be adjusted according to practical needs, and is not limited thereto.

The first buckle 100 has a first pin P1, a second pin P2 and a third pin P3, with the second pin P2 being a grounding terminal and the third pin P3 being a one-directional or bi-directional data transmission terminal. The first buckle 100 stores a plurality of instructions and communication protocols. The first buckle 100 can be put in trouser or shirt pockets, or serve as a decoration, an accessory or a trademark, and is not limited thereto.

Figure 4A:
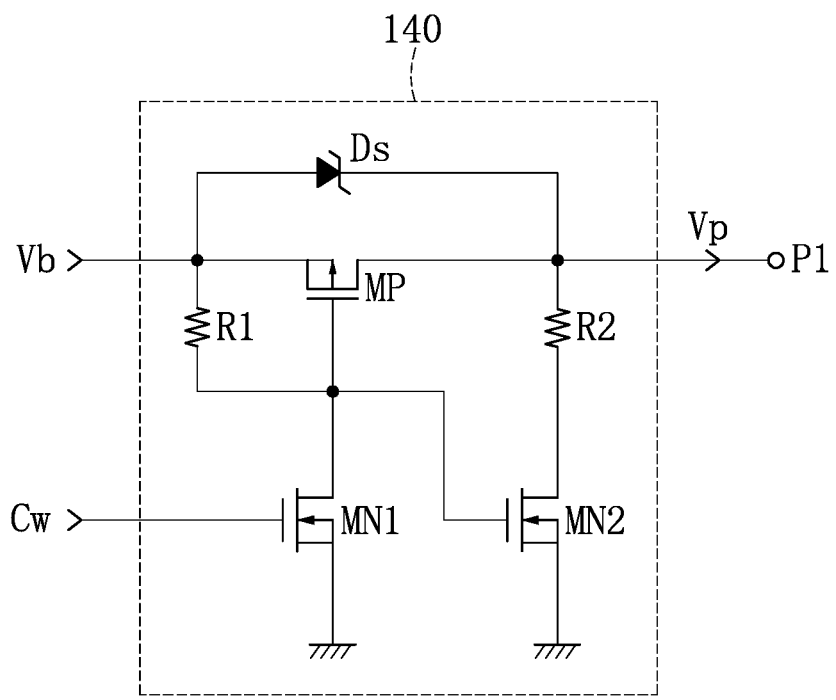
FIG. 4A shows a circuit diagram of a PWM generator according to one embodiment of the present disclosure.

The first pin P1 provides a DC power from 3 VDC to 24 VDC according to various applications, and the first processing unit 110 of the first buckle 100 transmits an instruction to the PWM generator 140, and then a PWM signal Vp that indicates that the instruction can be transmitted through the first pin P1. In FIG. 4A, for example, the first buckle P1 can provide 5 VDC. The first pin P1 can have, when an element Ds is a general diode or a Schottky diode, a waveform variation from 5V to 4.3V or from 5V to 4.7V under the circumstance that the voltage drop of a general diode is 0.7V and the voltage drop of a Schottky Diode is 0.3V, so that different instructions can be generated. For example, an instruction may represent calling the second buckles 200 that are connected with the first buckle 100, and another instruction may represent finding some of the second buckles 200 having specific functions, such as the second buckle 200 having a sensor. In the same system, the first buckle 100 can transmit instructions within different time segments t1 and t2 to the second buckles 200 using the same or different communication protocols, such as a communication protocol 1 and a communication protocol 2. When the first buckle 100 uses the communication protocol 1 within the time segment t1, the second buckles 200 using the communication protocol 1 transmits data to and receives data from the first buckle 100 through response signals Rs (i.e. the second buckles 200 using the communication protocol 1 and the first buckle 100 transits data mutually). At this time, there is no data transmission between the second buckles 200 using the communication protocol 2 and the first buckle 100. When the first buckle 100 uses the communication protocol 2 within the time segment t2, the second buckles 200 using the communication protocol 2 transmits data to and receives data from the first buckle 100 through response signals Rs (i.e. the second buckles 200 using the communication protocol 2 and the first buckle 100 transits data mutually). At this time, there is no data transmission between the second buckles 200 using the communication protocol 1 and the first buckle 100.

Additionally, within a time segment t3, the first buckle 100 can transmit another instruction through the first pin P1 to determine that only the second buckles 200 using the communication protocol 3 can transmit data to and receive data from the first buckle 100 through response signals Rs. In this manner, the second buckles 200 using different communication protocols can be integrated in the same system. Many kinds of devices using single-wire transmission can be used as the second buckles 200. The system designer can develop the second buckles using the communication protocols that they are familiar with, or other designers can develop the second buckles 200 using unique communication protocols for the purpose of market segmentation. The contents of the instructions and types of the communication protocols are not limited herein.

In this embodiment, the second buckle 200 stores at least one communication protocol that is also stored in the first buckle 100. In other words, all the communication protocols used by the second buckles 200 are stored in the first buckle 100. Different ones of the second buckles 200 can use the same or different communication protocols, and the first buckle 100 can use, recognize or analyze all the communication protocols that the second buckles 200 use. When the first buckle 100 needs to transmit data with one or more second buckles 200 using the communication protocol 1, an instruction is transmitted from the first processing unit 110 to the PWM generator to generate a PWM signal Vp for the second buckles 200. Only the second buckles 200 using the communication protocol 1 will generate data according to the PWM signal Vp and transmit data with the first buckle 100 through response signals Rs.

The PWM signal Vp represents the chosen instruction. The relationships among the first buckle 100, the PWM signal Vp (indicating the chosen instruction) and the second buckle 200 are described in the following descriptions.

In this embodiment, the communication protocols used by the first buckle 100 and the second buckles 200 can be Microchip 1-Wire, TI 1-Wire, Maxim 1-Wire, DALLAS 1-Wire, Single-Wire Protocol, LIN (Local Interconnect Network; LIN), or other communication protocols set by the system designers or users through which the first buckle 100 and the second buckles 200 can communicate. In other words, the types of the communication protocols used by the first buckle 100 and the second buckles 200 are not limited herein.

Each second buckle 200 has a fourth pin P4, a fifth pin P5 and a sixth pin P6 detachably fastened to the first buckle 100. When no second buckle 200 is fastened to the first buckle 100, the applications of the second buckle 200 will not be integrated by the first buckle 100. On the other hand, when there are second buckles 200 fastened to the first buckle 100, the first pin P1 is connected to the fourth pin P4 of each second buckle 200, the second pin P2 is connected to the fifth pin P5 of each second buckle 200, and the third pin P3 is connected to the sixth pin P6 of each second buckle 200. In addition, the fifth pin P5 is grounded. In this manner, the second buckles 200 are connected to the first buckle 100 in parallel.

The second buckles 200 can be any buckle device that can be put in pockets, or can be clothes, coats, pants, shoes, socks, gloves, hair decorations, brooches, scarves, rain coats, backpacks, bags . . . and the like, and is not limited thereto.

Different ones of the second buckles 200 have different device identification codes and may use different communication protocols. When the first buckle 100 transmits an instruction to inquire whether there is a new device, the newly added second buckle 200 transmits its device identification code to the first buckle 100 for recognition. When the first buckle 100 chooses one of the second buckles 200 using certain communication protocols within a time segment, the chosen second buckle 200 transmits data or receives data from the first buckle 100 through a response signal Rs. For example, the first buckle 100 can request one of the second buckles 200 having heart rate detecting function to provide feedback data on the heart rate, or the first buckle 100 can transmit data to one of the second buckles 200 having LCD or OLED devices.

The first buckle 100 can simultaneously inquire the second buckles 200 using different communication protocols if an interruption signal is needed. For example, the second buckles 200 can be devices having a touch screen or a voice input function, fire alarms, burglar alarms, quake sensors, collision avoidance sensor, toxic sensor, SOS callers and the like.

After the third pin P3 of the first buckle 100 receives a response signal Rs, the first buckle 100 processes data and generates another instruction according to the response signal, and transmits a PWM signal Vp from the first pin P1 according to the another instruction. The PWM signal Vp represents the another instruction. The second buckle 200 then again transmits a response signal Rs to the first buckle 100 according to the PWM signal Vp, such that the first buckle 100 can obtain relevant information of the second buckle 200. It is worth mentioning that, the PWM signals Vp transmitted from the first pin P1 of the first buckle 100 can be irrelevant to the subsequent PWM signal Vp transmitted to the first pin P1. In this embodiment, when the first buckle 100 receives an interruption signal form one of the second buckles 200 through the fourth pin P4, the first buckle 100 processes this interruption signal first and mutually communicates with the second buckle 200 that that transmits the interruption signal.

Figure 2:
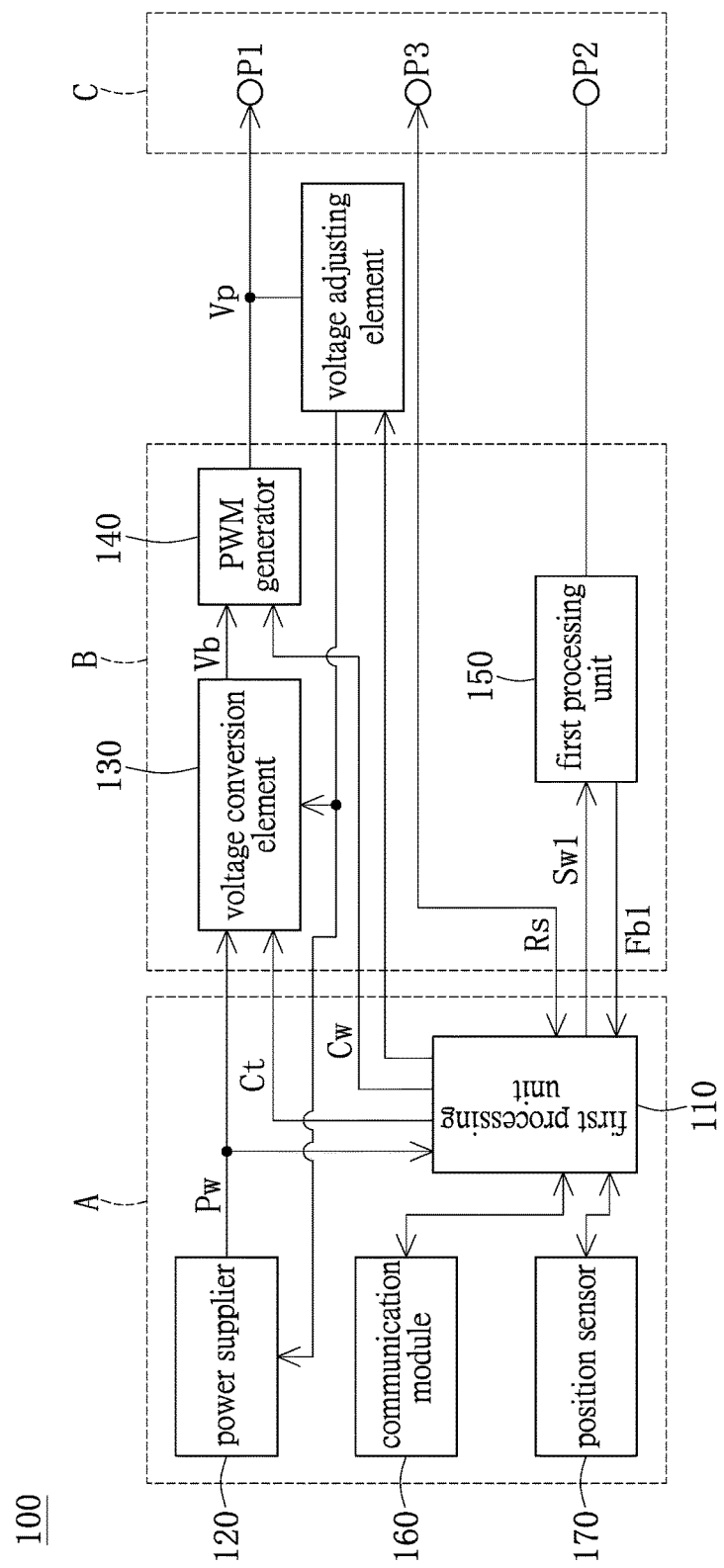
FIG. 2 shows a schematic diagram of a first buckle according to one embodiment of the present disclosure.

The inner structure and implementation of the first buckle 100 are described in the following descriptions. FIG. 2 shows a schematic diagram of a first buckle according to one embodiment of the present disclosure. As shown in FIG. 2, the first buckle 100 includes a first processing unit 110, a voltage conversion element 130 and a PWM generator 140. The first processing unit 110 receives a power Pw from a power supplier 120. In this embodiment, the power supplier 120 is a power supplier or an electric energy storage element such as a power bank or a battery.

The first processing unit 110 stores a plurality of instructions and communication protocols. In this embodiment, the first processing unit 140 includes an 8-bit, 16-bit, 32-bit or 64-bit single-core or multi-core microprocessor, or a single-core or multi-core microprocessor with a wireless communication module, such as Bluetooth communication modules or WIFI communication modules. The first processing unit 110 chooses one of the instructions and accordingly generates a control signal Cw and a voltage conversion signal Ct to respectively control the voltage conversion element 130 and the PWM generator 140. In this embodiment, the first processing unit 110 includes an 8-bit, 16-bit, 32-bit or 64-bit single-core or multi-core microprocessor, or a single-core or multi-core microprocessor with an integrated wireless communication module.

The voltage conversion element 130 is connected to the first processing unit 110, and receives a power Pw from the power supplier 120. The voltage conversion element 130 adjusts the voltage of the power Pw according to the voltage conversion signal Ct and thus generates an adjusting voltage Vb. In this embodiment, the voltage conversion element 130 is a buck converter. In other embodiments, the voltage conversion element 130 is a boost converter.

As shown in FIG. 2, a voltage adjusting element 180 is electrically connected to the first pin P1, the voltage conversion element 130 and the first processing unit 110. When a second buckle 200 is electrically connected to the first pin P1, the second pin P2 and the third pin P3, the first buckle 100 transmits a PWM signal Vp through the first pin P1 to inquire whether the second buckle 200 has a power that can be provided to the first buckle 100. If the second buckle 200 does not have a power that can be provided to the first buckle 100, the voltage adjusting element 180 will not work. If the second buckle 200 has a power that can be provided to the first buckle 100, the first processing unit 110 transmits a control signal to make the voltage adjusting element 180 work. The voltage adjusting element 180 receives the power from the second buckle 200 and the power supplier 120 stores the power provided by the second buckle 200. In this embodiment, implementations of the voltage adjusting element 180 can be varied according to different designs, and it is not limited thereto.

The PWM generator 140 is connected to the voltage conversion element 130 and the first processing unit 110. The PWM generator 140 receives the adjusting voltage Vb and generates the PWM signal Vp through the first pin P1 to the adjusting voltage Vb according to the control signal Cw. Specifically speaking, the PWM signal Vp can be a low voltage level continuing for a predetermined time, a high voltage level continuing for a predetermined time or a digital signal continuing for a predetermined time. FIG. 3A shows a schematic diagram of a PWM signal according to one embodiment of the present disclosure. As shown in FIG. 3A, the PWM generator 140 generates three PWM signals Vp corresponding to different time segments T1, T2 and T3 based on the adjusting voltage Vb. The PWM signals Vp are at low level, and each PWM signal Vp corresponds to a chosen instruction. For example, the PWM signal Vp corresponding to the time segment T1 represents an instruction to call all of the second buckles 200 connected to the first buckle 100, the PWM signal Vp corresponding to the time segment T2 represents an instruction to find the second buckles 200 having specific functions, and the PWM signal Vp corresponding to the time segment T3 represents an instruction to inform all of the second buckles 200 connected to the first buckle 100 to communicate with the first buckle 100 through single-wire transmission.

FIG. 3B shows a schematic diagram of a PWM signal according to another embodiment of the present disclosure. As shown in FIG. 3B, the PWM generator 140 generates three PWM signals Vp corresponding to different digital signals based on the adjusting voltage Vb. The PWM signals Vp are at low level, and each PWM signal Vp corresponds to a chosen instruction. For example, the PWM signal Vp is a digital signal "0100" and the instruction corresponding to this PWM signal Vp represents calling all of the second buckles 200 connected to the first buckle 100. The PWM signal Vp is a digital signal "0000", and the instruction corresponding to this PWM signal Vp represents finding the second buckles 200 having specific functions. The PWM signal Vp is a digital signal "0101", and the instruction corresponding to this PWM signal Vp represents informing all of the second buckles 200 connected to the first buckle 100 to communicate with the first buckle 100 through single-wire transmission.

The first buckle 100 optionally includes a wireless communication module 160 and a position sensor 170. The first buckle 100 mutually communicates with an external electronic device, such as a mobile phone, a local server or a remote server through the wireless communication module 160. Also, through the wireless communication module 160, the first buckle 100 can communicate with another first buckle 100 for different purposes. The wireless communication module 160 can be a Bluetooth communication module, a WIFI communication module, a Zigbee communication module, a mobile communication unit, a RF module of which the carrier frequency is 433 MHz~5.8 GHz, or any kind of combination thereof.

The mobile communication unit can be a 3G communication module, a 4G communication module, a 5G communication module or a GPRS communication module.

The wireless communication module 160 can be configured in the first buckle 100, or can be configured in the second buckle 200.

The position sensor 170 is configured to obtain the positioning information of the first buckle 100, such as the information regarding longitude and latitude, direction or acceleration. The position sensor 170 can be a GPS sensor, a three-axis accelerometer, an electronic compass, a Beacon device or any combination thereof. It is worth mentioning that, an NFC (i.e., Near Field Communication) integrated circuit can work with the Beacon device for security purposes, ID recognition, or e-payment.

The position sensor 170 can be configured in the first buckle 100, or can be configured in the second buckle 200. FIG. 4A shows a circuit diagram of a PWM generator according to one embodiment of the present disclosure. As shown in FIG. 4A, the PWM generator 140 includes a P-type transistor MP, a Schottky diode or a general diode DS, a first N-type transistor MN1 and a second N-type transistor MN2. The P-type transistor MP has a first end, a second end and a P-type control terminal. The first end of the P-type transistor MP is electrically connected to the voltage conversion element 130 to receive the adjusting voltage Vb. The second end of the P-type transistor MP is electrically connected to the first pin P1. The P-type control terminal of the P-type transistor MP is electrically connected to the first end of the P-type transistor MP through a first resistor R1. The Schottky diode DS has an anode and a cathode. The anode of the Schottky diode DS is electrically connected to the first end of the P-type transistor MP, and the cathode of the Schottky diode DS is electrically connected to the second end of the P-type transistor MP. The first N-type transistor MN1 has a third end, a fourth end and a first N-type control terminal. The third end of the first N-type transistor MN1 is electrically connected to the P-type control terminal of the P-type transistor MP, and the fourth end of the first N-type transistor MN1 is grounded. The first N-type control terminal of the first N-type transistor MN1 is electrically connected to the first processing unit 110 to receive the control signal Cw. The second N-type transistor MN2 has a fifth end, a sixth end and a second N-type control terminal. The fifth end of the second N-type transistor MN2 is electrically connected to the second end of the P-type transistor MP, the sixth end of the second N-type transistor MN2 is grounded, and the second N-type control terminal of the second N-type transistor MN2 is electrically connected to the P-type control terminal of the P-type transistor MP.

The first processing unit 110 generates a control signal Cw according to the chosen instruction and transmits the control signal Cw to the first N-type transistor MN1. The voltage conversion element 130 generates an adjusting voltage to control the on and off of the P-type transistor MP, the first N-type transistor MN1 and the second N-type transistor MN2, and thus transmits a PWM signal Vp representing the chosen instruction to the first pin P1. When the current of the second buckle 200 is too small, the voltage drop of the diode DS will not be significant enough. In this case, a small current generated when the second N-type transistor MN2 and a second resistor R2 is turned on can be used to increase the voltage drop of the diode DS and allow the entire circuit to work normally. The transistors described above can be general transistors or MOSFETs. The above circuit structure is exemplified for illustrative purposes only and should not be taken as limiting the circuit structure of the first processing unit 110.

Figure 4B:
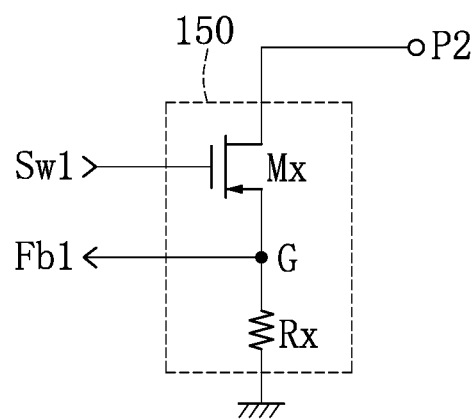
FIG. 4B shows a circuit diagram of a first current protection element according to one embodiment of the present disclosure.

FIG. 4B shows a circuit diagram of a first current protection element according to one embodiment of the present disclosure. As shown in FIG. 2 and FIG. 4B, the first buckle 100 further includes a first current protection element 150. The first current protection element 150 is coupled to the first processing unit 110. The first processing unit 110 detects the current flowing through the first processing unit 150, and makes the first processing unit 150 become a short circuit or cuts off the first processing unit 150 according to the current flowing through the first processing unit 150. In this embodiment, the first processing unit 150 includes an N-type transistor Mx and a current detection resistor Rx. One end of the N-type transistor Mx is electrically connected to the second pin P2, and another end of the N-type transistor Mx is grounded through the resistor Rx. The control terminal of the N-type transistor Mx is electrically connected to the first processing unit 110 to receive a switching signal SW1. A node G between the N-type transistor Mx and the resistor Rx is electrically connected to the first processing unit 110 to transmit a current detection signal Fb1 to the first processing unit 110.

The first processing unit 110 detects the current flowing through the first processing unit 150 according to the current detection signal Fb1. When the current detection signal Fb1 is larger than a predetermined voltage, the N-type transistor Mx is turned off to avoid damage to circuit elements of each second buckle 200. The predetermined voltage is determined through a built-in program of the first buckle 100 according to the device code sent from the second buckle 200.

Figure 5:
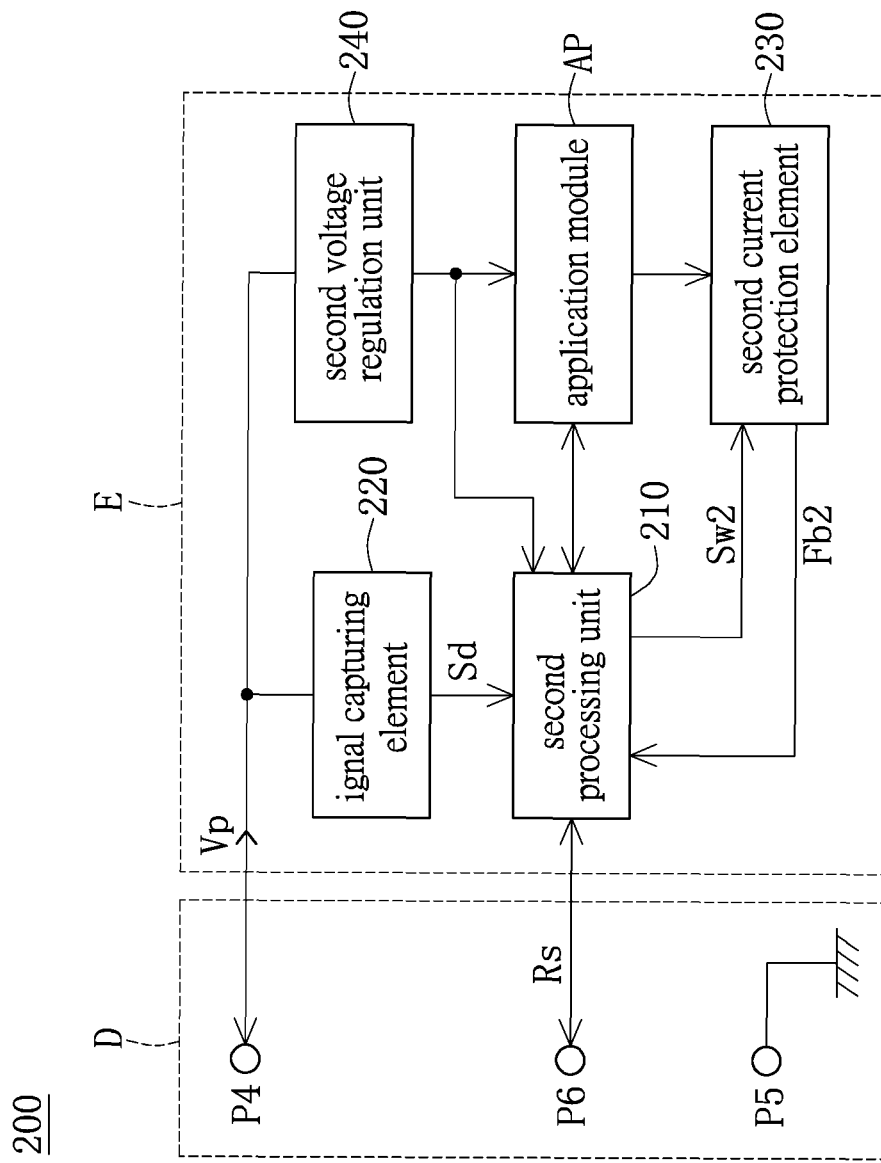
FIG. 5 shows a schematic diagram of a second buckle according to one embodiment of the present disclosure.

The inner structure and implementation of the second buckle 200 are described in the following descriptions. FIG. 5 shows a schematic diagram of a second buckle according to one embodiment of the present disclosure. As shown in FIG. 5, each second buckle 200 includes a signal capturing element 220, a second processing unit 210 and a second voltage regulation unit 240. The signal capturing element 220 is coupled to the fourth pin P4 and receives the PWM signal Vp to accordingly transmit a captured signal Sd to the second processing unit 210. The captured signal Sd indicates the PWM signal Vp. The second processing unit 210 is coupled to the signal capturing element and the sixth pin P6 to control an application module AP. The application module AP is configured in the second buckle 200. For example, the application module AP can be a touch panel, a screen, an image capturing element, a sensor, a heat dissipation pad and the like, and is controlled by the second processing unit 210.

One end of the second voltage regulation unit 240 is coupled to the fourth pin P4, and the other end of the second voltage regulation unit 240 transmits a steady voltage to the application module AP and the second processing unit 210.

Figure 6A:
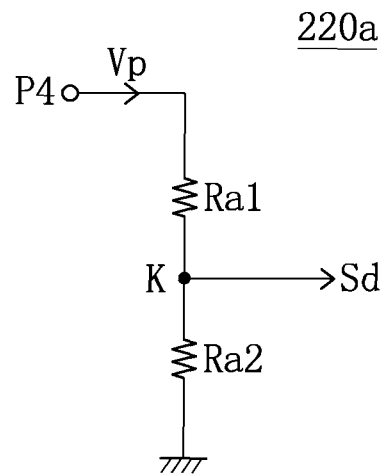
FIG. 6A shows a circuit diagram of a signal capturing element according to one embodiment of the present disclosure.

FIG. 6A shows a circuit diagram of a signal capturing element according to one embodiment of the present disclosure. The signal capturing element 220a has two resistors Ra1 and Ra2. One end of the resistor Ra1 is coupled to the fourth pin P4, the other end of the resistor Ra1 is coupled to one end of the resistor Ra2, and the other end of the resistor Ra2 is grounded. One node K between the resistors Ra1 and Ra2 is electrically connected to the second processing unit 210. The signal capturing element 220a receives the PWM signal, and a captured signal Sd is transmitted from the node K between the resistors Ra1 and Ra2 to the second processing unit.

Figure 6B:
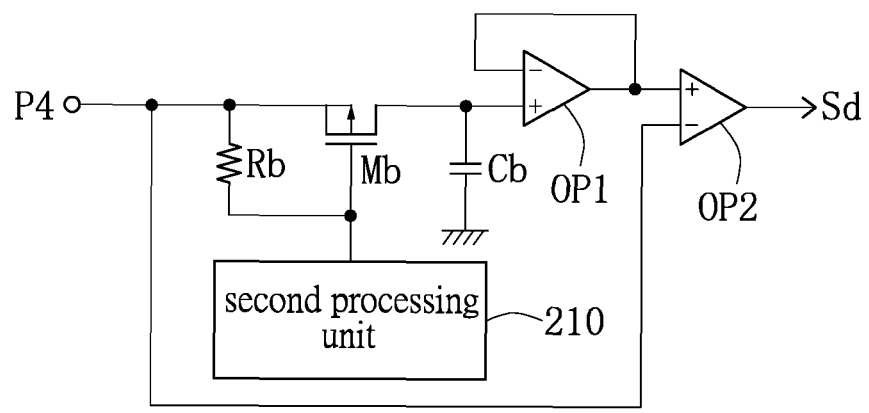
FIG. 6B shows a circuit diagram of a signal capturing element according to another embodiment of the present disclosure.
Figure 6C:
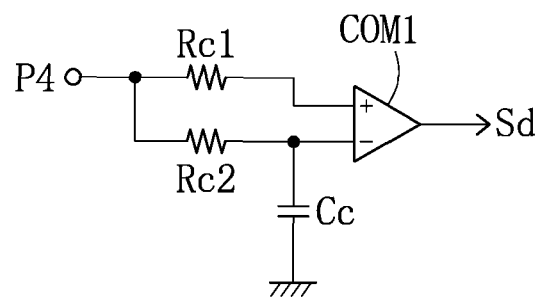
FIG. 6C shows a circuit diagram of a signal capturing element according to still another embodiment of the present disclosure.
Figure 6D:
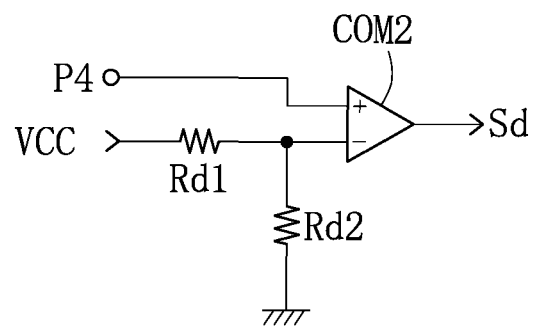
FIG. 6D shows a circuit diagram of a signal capturing element according to still another embodiment of the present disclosure.

FIG. 6B shows a circuit diagram of a signal capturing element according to another embodiment of the present disclosure, FIG. 6C shows a circuit diagram of a signal capturing element according to still another embodiment of the present disclosure, and FIG. 6D shows a circuit diagram of a signal capturing element according to still another embodiment of the present disclosure. As shown in FIG. 6B, the signal capturing element 220b includes a resistor Rb, a transistor Mb, a capacitor Cb, a first amplifier OP1 and a second amplifier OP2. The first end of the transistor Mb is electrically connected to the fourth pin P4, and the second end of the transistor Mb is electrically connected to the positive input end of the first amplifier OP1. The control terminal of the transistor Mb is electrically connected to the first end of the transistor Mb through the resistor Rb. One end of the capacitor Cb is electrically connected to the second end of the transistor Mb, and the other end of the capacitor Cb is grounded. The negative input end of the first amplifier OP1 is electrically connected to the output end of the first amplifier OP1. The positive input end of the first amplifier OP1 is electrically connected to the output end of the first amplifier OP1. The negative input end of the first amplifier OP1 is electrically connected to the fourth pin P4. The output end of the first amplifier OP1 is electrically connected to the second processing unit 210. The signal capturing element 220b receives the PWM signal Vp. The second processing unit 210 controls the control terminal of the transistor Mb for controlling the turning on and off of the transistor Mb. The signal capturing element 220b transmits a captured signal to the second processing unit 210.

As shown in FIG. 6C, the signal capturing element 220c has a comparator COM1. The positive input end of the comparator COM1 is electrically connected to the fourth pin P4 through a resistor Rc1, and the negative input end of the comparator COM1 is electrically connected to the fourth pin P4 through a resistor Rc2. One end of a capacitor Cc is electrically connected to the negative input end of the comparator COM1, and the other end of the capacitor Cc is grounded. The output end of the comparator COM1 is electrically connected to the second processing unit 210. The signal capturing element 220c receives the PWM signal Vp and compares the voltages of the positive input end and the negative input end of the comparator COM1 to generate a captured signal Sd. The captured signal Sd is transmitted to the second processing unit 210.

As shown in FIG. 6D, the signal capturing element 220d includes a comparator COM2. The positive input end of the comparator COM2 is electrically connected to the fourth pin P4. The negative input end of the comparator COM2 receives a voltage VCC through the resistor Rc2. One end of the capacitor Cc is electrically connected to the negative input end of the comparator COM2, and the other end of the capacitor Cc is grounded. One end of a resistor Rd2 is electrically connected to the negative input end of the comparator COM2, and the other end of the resistor Rd2 is grounded. The output end of the comparator COM2 is electrically connected to the second processing unit 210. The signal capturing element 220d receives the PWM signal Vp and compares the voltages of the positive input end and the negative input end of the comparator COM2 to generate a captured signal Sd. The captured signal Sd is transmitted to the second processing unit 210.

In FIG. 5, the second buckle 200 includes a second current protection element 230. The second current protection element 230 is coupled between the second current protection element 230 and the application module AP. The second processing unit 210 detects the current flowing through the second current protection element 230, and short circuits or cuts off the second current protection element 230 according to the current flowing through the second current protection element 230. The structure of the second current protection element 230 is similar to the structure of the first processing unit 150. The second processing unit 210 detects the current flowing through the second current protection element 230 according to a current detection signal Fb2. When the current detection signal Fb2 is larger than a predetermined voltage, the second current protection element 230 is cut off to avoid damage to circuit elements of the second buckle 200.

Figure 7:
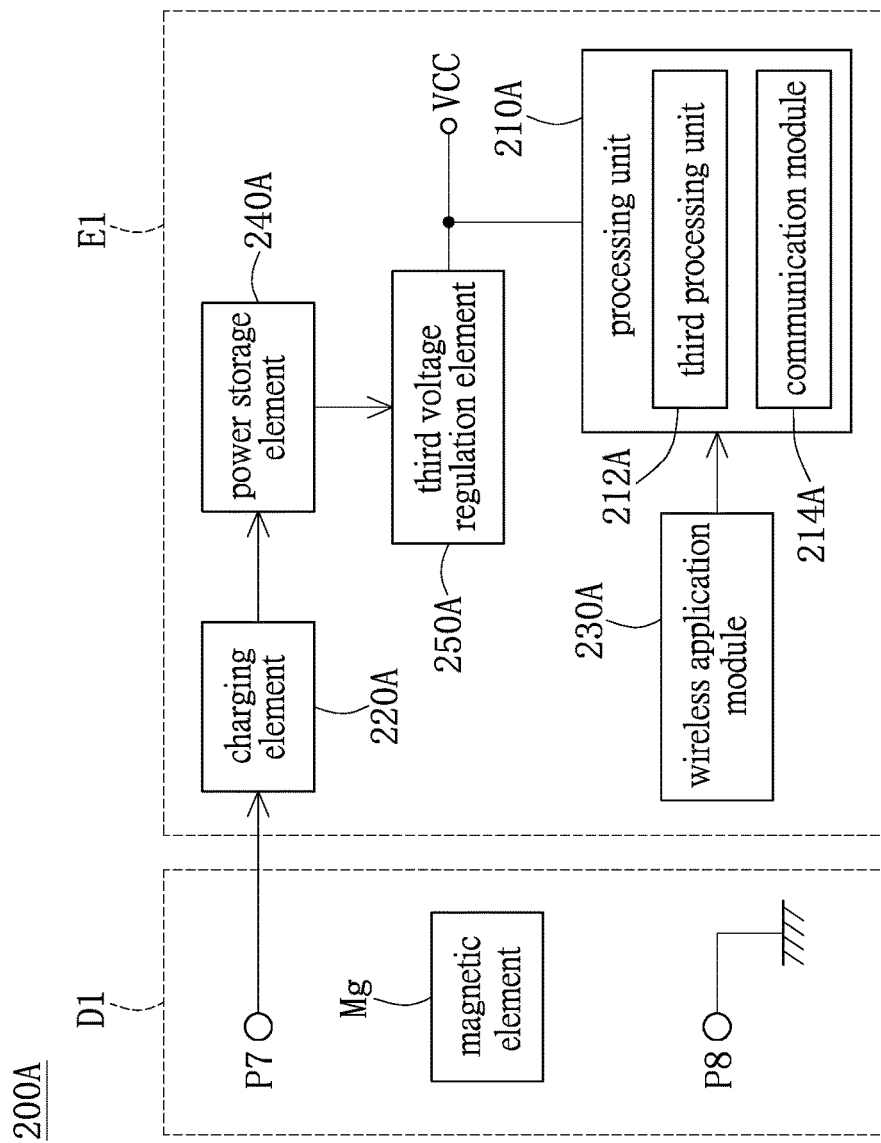
FIG. 7 shows a schematic diagram of a second buckle according to another embodiment of the present disclosure.

FIG. 7 shows a schematic diagram of a second buckle according to another embodiment of the present disclosure.

The second buckle 200A includes a transition interface D1 and a controller E1. The controller E1 is connected to the seventh pin P7 and the eighth pin P8 due to the magnetic force of a magnetic element Mg. When the power storage element 240A, such as a battery, is configured in the application module AP, and one of the Bluetooth communication module, the WIFI communication module and an RF module of which the carrier frequency is 433 MHz~4.58 GHz is configured in the application module AP, the second buckle 200A becomes a close-range buckle or a remote buckle. This buckle 200A can communicate with the first buckle 100 in a wireless manner. The processing unit 210A of the second buckle 200A has a built-in microcontroller (i.e., MCU) which is 8-bit, 16-bit, 32-bit or 64-bit, and which is a third processing unit 212A. When the processing unit 210A also has a built-in communication module 214A, such as the Bluetooth communication module, the WIFI communication module, or the SUB-G RF module, the second buckle 200A can be a wireless communication device. The function modules of the second buckle 200A can be freely designed, and is not limited to that disclosed in the present disclosure.

The second buckle 200A has a power storage element 240A, such as a button battery that can be charged. The application module AP of the second buckle 200A can be a touch panel and a 1.2G wireless communication module, which are a wireless application module 230A. The second buckle 200A can transmit data to and receive data from the first buckle 100a through the wireless communication module instead of the three-wire transmission. When the second buckle 200A is taken from the transmission interface C and is put on a table, in a bag or on handles of a bike, the second buckle 200A becomes a touch-enabled remote controller. When the second buckle 200A is coupled to the transmission interface C, the second buckle 200A is charged by the power provided by the first buckle 100a. The power provided by the first buckle 100a can be stored in the power storage element 24A through the charging element 220A. The power storage element is electrically connected to the processing unit 210A and is coupled to a voltage VCC.

The second buckle 200A can have a built-in button battery that can be charged. The application module AP is an audio receiving and recognizing module and a second processing unit having a 1.2G wireless communication module. When the second buckle 200 is coupled to the transmission interface C, the second buckle 200 is charged by the power provided by the first buckle 100. The second buckle 200 can transmit data to and receive data from the first buckle 100a through the wireless communication module instead of the three-wire transmission. When the second buckle 200A is taken from the transmission interface C and is put on a table, in a bag or on handles of a bike, or is built in a logo of clothes, it can be audio controlled wirelessly.

Figure 8A:
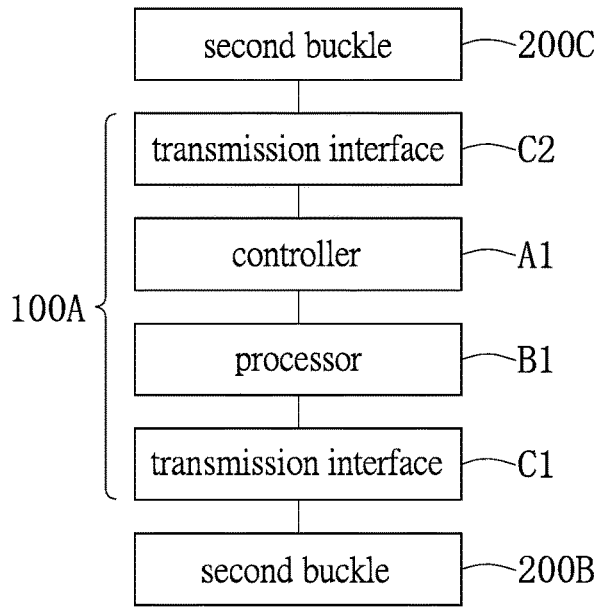
FIG. 8A and FIG. 8B are schematic diagrams showing how the first buckle and the second buckles work together according to one embodiment of the present disclosure.
Figure 8B:
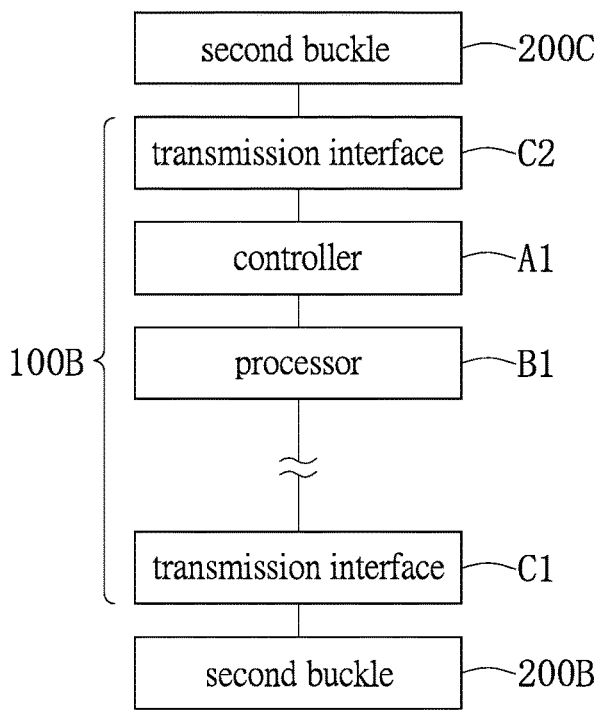

FIG. 8A and FIG. 8B are schematic diagrams showing how the first buckle and the second buckles work together according to one embodiment of the present disclosure.

The configuration of the first buckle 100A, the second buckle 200B and the second buckle 200C can be designed as illustrated in FIG. 8A. As shown in FIG. 8A, the second buckle 200B and the second buckle 200C are coupled to two sides of the first buckle 100A through the transmission interface C1 and the transmission interface C2. The first buckle 100A mutually communicates with the second buckle 200B and the second buckle 200C through the controller A1 and the controller B1.

As shown in FIG. 8B, the second buckle is coupled to one side of the first buckle 100B. The transmission interface C1 of the first buckle 100B can remotely communicate with the processor B1 and the controller A1 in a wired or wireless manner. Thus, there can be a predetermined distance between the transmission interface C1 and the processor B1, and there can also be a predetermined distance between the transmission interface C1 and the controller A1. In other words, there can be a predetermined distance between the second buckle 200B and the processor B1, and there can also be a predetermined distance between the second buckle 200B and the controller A1. In this manner, the second buckle 100B can be configured away from the second buckle 200B.

Figure 9A:
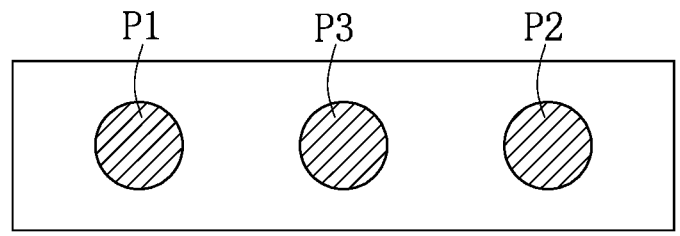
FIG. 9A, FIG. 9B and FIG. 9C are schematic diagrams showing the first pin, the second pin and the third pin of the first buckle according to one embodiment of the present disclosure.
Figure 9B:
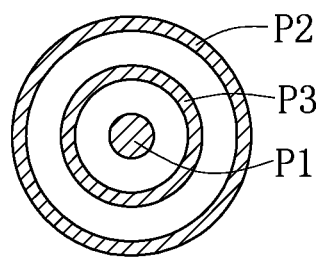
Figure 9C:
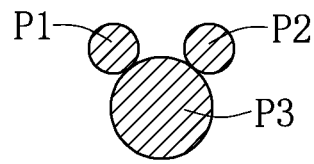

FIG. 9A, FIG. 9B and FIG. 9C are schematic diagrams showing the first pin, the second pin and the third pin of the first buckle according to one embodiment of the present disclosure.

As shown in FIG. 9A, the first pin P1, the second pin P2 and the third pin P3 can be configured along the same direction. As shown in FIG. 9B, the first pin P1, the second pin P2 and the third pin P3 can be configured in concentric circles. As shown in FIG. 9C, the sizes of the first pin P1 and the second pin P2 are smaller, so that they can be configured at one side of the third pin P3. However, the configuration of the first pin P1, the second pin P2 and the third pin P3 is not limited thereto.

The controller A of the first buckle 100 is the first processing unit 110, the power supplier 120, the communication module 160 and the position sensor 170. The processor B of the first buckle 100 is the voltage conversion element 130 and the PWM generator 140. The transmission interface C of the first buckle 100 is the first pin P1, the second pin P2 and the third pin P3. The transmission interface C of the second buckle 200 is the fourth pin P4, the fifth pin P5 and the sixth pin P6. The controller of the second buckle 200 is the second processing unit 210, the signal capturing element 220 and the application module. The controller A controls the processor B according to an instruction to transmit a PWM signal Vp to the transmission interface C. The PWM signal Vp is transmitted to the controller E through the transmission interface C and the transmission interface D. The controller E transmits a response signal Rs to the transmission interface D according to the PWM signal Vp. The response signal Rs is transmitted to the controller A through the transmission interface D and the transmission interface C. In this manner, the first buckle 100 can be integrated with each second buckle 200.

When the first buckle 100 is coupled to the second buckles 200, the first buckle 100 transmits power, different PWM signals Vp (corresponding to different instructions) or different digital signals (corresponding to different instructions) to the second buckle 200 through the three-wire transmission. The second buckle 200 analyzes the received signal and accordingly transmits a response signal Rs to the first buckle 100. In this manner, the first buckle 100 can obtain the information of each second buckle 200 and can thus integrate and control the application modules of each second buckle 200.

The application modules AP of the second buckle 200 can be, for example, a touch keyboard, a touchpad, a Bluetooth remote control, a voice recognition controller, a smart watch, a camera, a video recorder, a GPS, an LED, a battery module, a power bank, a sensor, a vibration reminder, a mobile phone, an e-payment system, an indoor positioning beacon, a heat dissipation pad, a USB charger, a humidity sensor, a pressure sensor, a barometric sensor, an alcohol concentration detector, a $CO_2$ sensor, a PM2.5 monitor, a heartbeat sensor, a UV sensor, a PIR body detection module, an inertial sensor, a motion sensor, an acceleration sensor, a gesture recognition module, a fingerprint reader, an eye tracker, a Gyroscope module, a magnetic field sensing module, an electronic nose module, an alcohol sensor, an infrared temperature sensor, a brainwave control and detection module, a toxic gas detection module, a laser pointer, a laser receiver module, a laser or ultrasonic ranging module, an electronic compass, an electronic compass module, a wireless intercom module, a Bluetooth intercom module, a WIFI camera module, a WIFI communication module, an NFC module, an infrared transmission module, a chip card module, a membership card module, a financial card module, an e-passport, a 2D or 3D bar code scanner, a rape alarm, a mosquito repellent, a dog repellent, a clothing warmer, a timer, a radio module, a memory card, a flash, an infrared remote control, a UV disinfection module, an LED direction indicator, an LED brake lights, an LED warning light, an LED flashlight module, a pinhole camera, a microphone module, an SOS distress signal transmitter, an energy collecting module, a small wind power generation module, a small vibration power generation module, a small hand-generated power module, a power bank module, a battery module, an OLED display module, an electronic paper display module, or an LED display module.

The second buckle 200 often has the voice input function or the touch input function. This kind of the second buckle 200 can be directly incorporated in clothes, such that the first buckle 100 does not need a transmission interface C and the second buckle 200 does not need a transmission interface D.

Figure 10:
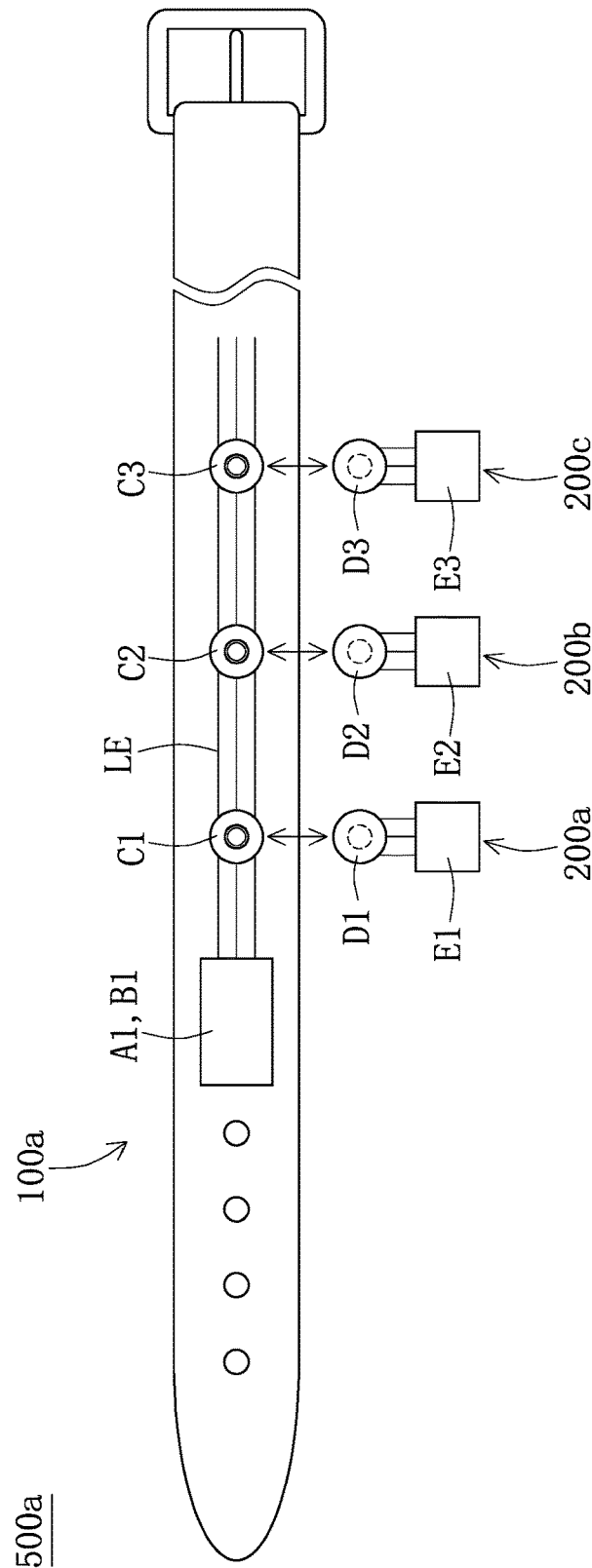
FIG. 10 shows a schematic diagram of a three-wire wearable device used as a belt according to one embodiment of the present disclosure.

FIG. 10 shows a schematic diagram of a three-wire wearable device used as a belt according to one embodiment of the present disclosure. As shown in FIG. 10, the three-wire wearable device 500a has a first buckle 100a and three second buckles 200a, 200b and 200c. The first buckle 100a is configured on the belt, and includes a controller A1, a processor B1, and a plurality of transmission interfaces C1, C2 and C3. The controller A and the processor B1 are configured at the same position on the belt. The three-wire cables LE are electrically connected to the processor B1 and configured on the belt. The transmission interfaces C1, C2 and C3 are electrically connected to the three-wire cables LE.

The second buckle 200a has a transmission interface D1 and a controller E1. The second buckle 200b has a transmission interface D2 and a controller E2. The second buckle 200c has a transmission interface D3 and a controller E3. The transmission interfaces D1, D2 and D3 are coupled to the transmission interfaces D4, D5 and D6, respectively, such that the second buckles 200a, 200b and 200c can be connected to the first buckle 100a in parallel. In other embodiments, the first buckle 100a can also be connected to the second buckles 200a-200c in serial. Thus, the first buckle 100a can be connected to the second buckles 200a-200c in serial or in parallel, and it is not limited thereto.

The first buckle 100a can communicate with the second buckles 200a, 200b and 200c through the three-wire cables LE, so as to integrate the function modules of each of the second buckles connected with the first buckle. The working principle of the controller A1, the processor B1 and the transmission interfaces C1, C2 and C3 of the first buckle 100a, and the transmission interfaces D1, D2 and D3 and the controllers E1, E2 and E3 of the second buckles 200a, 200b and 200c is similar to the working principle of the controller A, the processor B and transmission interfaces C and transmission interfaces D and the controller E, and thus further details thereof are omitted herein.

Figure 11:
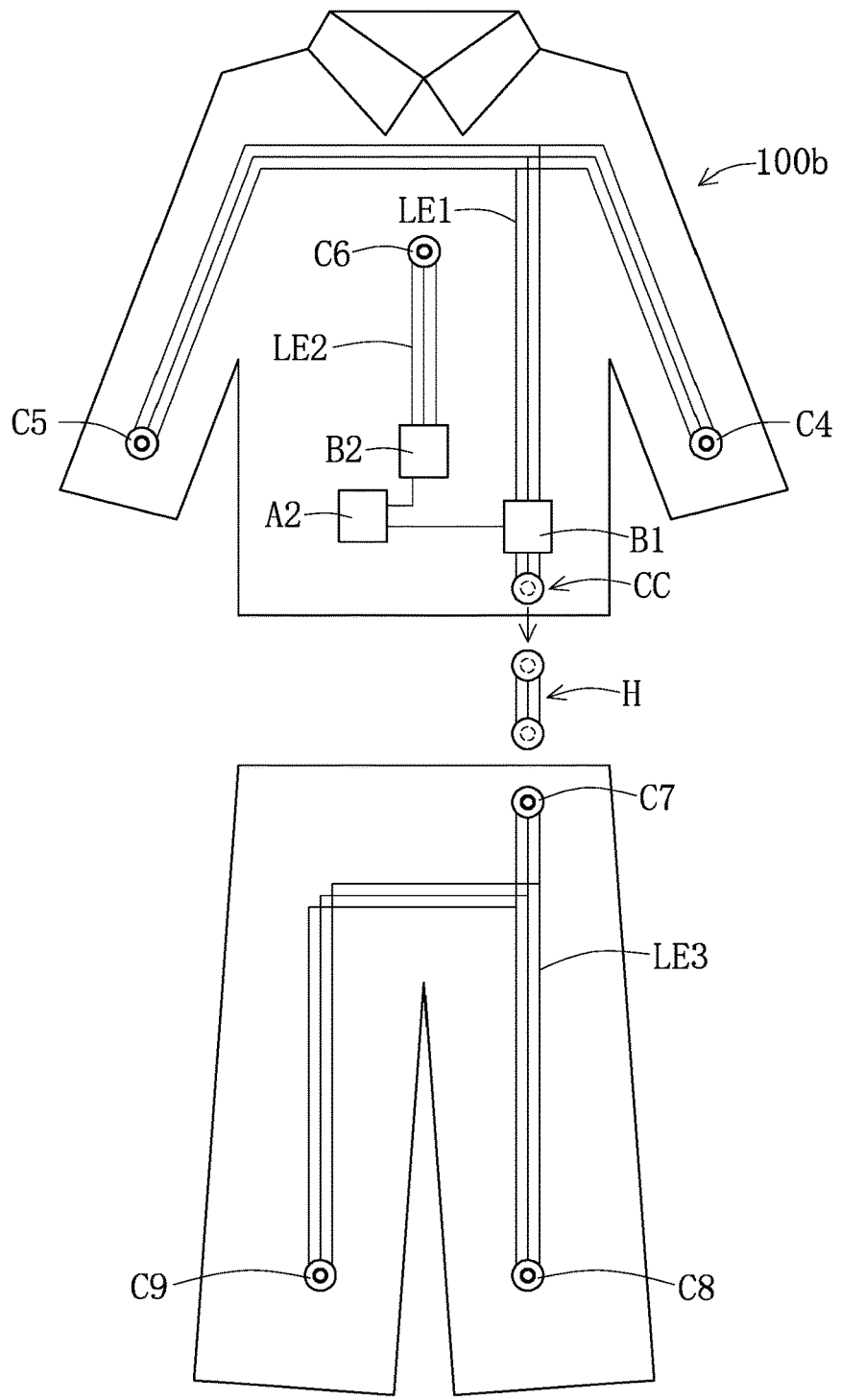
FIG. 11 shows a schematic diagram of a three-wire wearable device used as shirts and trousers according to one embodiment of the present disclosure.

FIG. 11 shows a schematic diagram of a three-wire wearable device used as shirts and trousers according to one embodiment of the present disclosure. Since the structure of the second buckle in this embodiment is similar to that of the second buckles in the above embodiments, the second buckles are omitted from FIG. 11. As shown in FIG. 11, the first buckle 100b of the three-wire wearable device 500b is configured in the shirts and the trousers, and includes a controller A2, two processors B1 and B2, and transmission interfaces C5, C6, C7, C8 and C9. The controller A2 is electrically connected to the processor B1 and the processor B2, and the processor B1 and the processor B2 are configured at the same position on the shirts.

The three-wire cables LE1 are electrically connected to the processor B1 and configured on the shirts, and the three-wire cables LE2 are electrically connected to the processor B2 and configured on the shirts. The three-wire cables LE3 are configured on the trousers. The transmission interfaces C4 and C5 are electrically connected to the three-wire cables LE1, the transmission interface C6 is electrically connected to the three-wire cables LE2, and the transmission interfaces C6, C7, C8 and C9 are electrically connected to the three-wire cables LE3. The extension cable H is electrically connected to the transmission interface CC and the transmission interface C7, such that the processor B1 can simultaneously transmit a PWM signal Vp to the transmission interfaces C4 and C5 and to the transmission interfaces C7, C8 and C9.

It is worth mentioning that, due to the configuration of the three-wire cables LE1-LE3 and the processors B1 and B2, the second buckles connected to the three-wire cables LE1 and LE3 can be small power electronic elements, such as a touch panel, a screen, an image capturing element or types of sensors, the second buckles connected to the three-wire cable LE2 can be large power electronic elements, such as a heat dissipation pad, a small fan or a phone charger. Thus, the three-wire cables LE1 and LE3 can be made of thinner cables, and the three-wire cable LE2 can be made of thicker cables. The types of the second buckles connected to the three-wire cables LE1-LE3 can be varied according to practical requirements, and are not limited herein.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A three-wire wearable device, comprising:
a first buckle having a first pin, a second pin and a third pin and including a first processing unit, wherein the first processing unit stores a plurality of instructions and a plurality of communication protocols, the first buckle chooses one of the instructions and accordingly generates a PWM signal, and the PWM signal is transmitted to the first pin and represents the chosen instruction; and
a plurality of second buckles, wherein each of the second buckles has a fourth pin, a fifth pin and a sixth pin, and each of the second buckles is detachably fastened to the first buckle;
wherein when the second buckles are fastened to the first buckle, the first pin, the second and the third pin of the first buckle are electrically connected to the fourth pin, the fifth pin and the sixth pin of each of the second buckles, respectively;
wherein when the second buckles are fastened to the first buckle, the PWM signal from the first pin of the first buckle is transmitted to the fourth pin of each of the second buckles, the second buckle generates a response signal according to the PWM signal, and the PWM signal is transmitted from the sixth pin of the second buckle to the third pin of the first buckle such that the first buckle obtains an information related to each of the second buckles;
wherein the communication between the first buckle and one of the second buckles is based on one of the communication protocols.

2. The three-wire wearable device according to claim 1, wherein the second buckles are fastened to the first buckle in serial or in parallel.

3. The three-wire wearable device according to claim 1, wherein when the first buckle mutually communicates with the second buckles according to one of the communication protocols, the second buckles using the chosen communication protocol mutually communicate with the first buckle, and the second buckles using the other communication protocols are unable to communicate with the first buckle.

4. The three-wire wearable device according to claim 1, wherein when the first buckle mutually communicates with the second buckles according to another communication protocol, at least one of the second buckles using the chosen communication protocol mutually communicates with the first buckle.

5. The three-wire wearable device according to claim 1, wherein when one of the second buckles is fastened to the first buckle newly added, the information related to the one of the second buckles is transmitted from its sixth pin to the first buckle, and the information includes a device identification code of the one of the second buckles and the communication protocol used by the one of the second buckles.

6. The three-wire wearable device according to claim 1, wherein when an interruption signal is transmitted from the fourth pin of one of the second buckles to the first buckle, the first buckle prioritizes the communication with the second buckle transmitting the interruption signal and mutually communicate with the second buckle transmitting the interruption signal.

7. The three-wire wearable device according to claim 1, wherein the communication protocols used by the first buckle and the second buckles are single-wire protocols.

8. The three-wire wearable device according to claim 1, wherein each of the second buckles stores one or several of the communication protocols.

9. The three-wire wearable device according to claim 1, wherein the first buckle generates the PWM signal according to the chosen communication protocol and the PWM signal is transmitted to the second buckles, and the second buckles using the chosen communication protocol transmits a response signal back to the first buckle within a predetermined time according to the PWM signal and the chosen communication protocol.

10. The three-wire wearable device according to claim 1, wherein the PWM is a digital signal, or the PWM signal remains at a low level or a high level within a predetermined time, and the predetermined time is related to the chosen instruction.

11. The three-wire wearable device according to claim 1, wherein the first buckle includes:
a first processing unit storing the instructions, choosing one of the instructions, and generating a control signal and a voltage conversion signal according to the chosen instruction;
a voltage conversion element connected to the first processing unit, receiving a voltage, and adjusting the voltage according to the voltage conversion signal to generate an adjusting voltage; and
a PWM generator connected to the voltage conversion element and the first processing unit, receiving the adjusting voltage, and generating the PWM signal at the adjusting voltage according to the control signal, wherein the PWM signal is transmitted to the first pin of the first buckle.

12. The three-wire wearable device according to claim 11, wherein the first processing unit includes an 8-bit, 16-bit, 32-bit or 64-bit single-core or multi-core microprocessor, or a single-core or multi-core microprocessor with an integrated wireless communication module.

13. The three-wire wearable device according to claim 11, wherein the first buckle further includes:
a wireless communication module, wherein the first buckle is connected to an external electronic device or another first buckle through the wireless communication module.

14. The three-wire wearable device according to claim 13, wherein the communication module includes one or more of a Bluetooth communication module, a WIFI communication module, a Zigbee communication module, a mobile communication module, an RF module having 433 MHz~5.8 GHz carrier frequency, a 3G communication module, a 4G communication module, a 5G communication module and a GPRS communication module.

15. The three-wire wearable device according to claim 11, wherein the first buckle further includes:
a position sensor obtaining a location information of the first buckle, wherein the position sensor is a GPS receiver, a three-axis accelerometer, an electronic compass, an indoor position sensor or an NFC module.

16. The three-wire wearable device according to claim 11, wherein the first buckle further includes:

a first current protection element connected to the first processing unit, wherein the first processing unit detects a current flowing through the first current protection element and short circuits or cuts off the first current protection element according to the detected current.

17. The three-wire wearable device according to claim 11, wherein the PWM generator includes:
a P-type transistor having a first end, a second end and a P-type control terminal, wherein the first end of the P-type transistor is electrically connected to the voltage conversion element to receive the adjusting voltage, the second end of the P-type transistor is electrically connected to the first pin of the first buckle, and the P-type control terminal of the P-type transistor is electrically connected to the first end of the P-type transistor through a first resistor;
a Schottky diode having an anode and a cathode, wherein the positive end of the Schottky diode is electrically connected to the first end of the P-type transistor and the negative end of the Schottky diode is electrically connected to the second end of the P-type transistor;
a first N-type transistor, having a third end, a fourth end and a first N-type control terminal, wherein the third end of the first N-type transistor is electrically connected to the P-type control terminal of the P-type transistor, the fourth end of the first N-type transistor is grounded, and the first N-type control terminal of the first N-type transistor is electrically connected to the first processing unit to receive the control signal; and
a second N-type transistor, having a fifth end, a sixth end and a second N-type control terminal, wherein the fifth end of the second N-type transistor is electrically connected to the second end of the P-type transistor through a second resistor, the sixth end of the second N-type transistor is grounded, and the second N-type control terminal of the second N-type transistor is electrically connected to the P-type control terminal of the P-type transistor.

18. The three-wire wearable device according to claim 1, wherein each of the second buckles include:
a signal capturing element connected to the fourth pin of the second buckle, receiving the PWM signal, and generating a captured signal representing the PWM signal; and
a second processing unit connected to the signal capturing element and the sixth pin of the second buckle, transmitting a response signal or a data to the sixth pin of the second buckle according to the captured signal, and controlling an application module.

19. The three-wire wearable device according to claim 18, wherein each of the second buckles further include:
a second current protection element connected between the second processing unit and the application module, wherein the second processing unit detects a current flowing through the second current protection element and short circuits or cuts off the second current protection element according to the detected current.

20. The three-wire wearable device according to claim 11, wherein:
the first buckle further includes at least a wireless communication module, the wireless communication module being electrically connected to the first processing unit; and
the second buckle further includes at least a wireless application module, the wireless application module is electrically connected to the second processing unit, the first processing unit controls the wireless communication module to transmit a data signal to the wireless application module, and the wireless application module transmits the data signal to the second processing unit.

* * * * *